United States Patent [19]

Ten Kate

[11] Patent Number: 5,541,902
[45] Date of Patent: Jul. 30, 1996

[54] INFORMATION RECORDING DEVICE WHICH REARRANGES INFORMATION TO CLOSE GAPS

[75] Inventor: Reinier Ten Kate, Eindhoven, Netherlands

[73] Assignee: U.S. Philips Corporation, New York, N.Y.

[21] Appl. No.: 203,971

[22] Filed: Mar. 1, 1994

[30] Foreign Application Priority Data

Mar. 16, 1993 [BE] Belgium .................................. 9300248

[51] Int. Cl.⁶ ...................................................... G11B 7/00
[52] U.S. Cl. .............................................. 369/54; 369/58
[58] Field of Search ............................ 369/32, 44.32, 369/58, 48, 54, 50, 47, 13

[56] References Cited

U.S. PATENT DOCUMENTS

| | | | |
|---|---|---|---|
| 4,970,608 | 11/1990 | Fukuda et al. | 360/14.1 |
| 5,274,617 | 12/1993 | Terashima et al. | 369/54 |
| 5,295,124 | 3/1994 | Shirako | 369/54 |
| 5,311,491 | 5/1994 | Yamagami et al. | 369/54 |
| 5,367,510 | 11/1994 | Ando | 369/54 |
| 5,392,265 | 2/1995 | Takezawa | 369/54 |

FOREIGN PATENT DOCUMENTS

| | | |
|---|---|---|
| 0275972 | 7/1988 | European Pat. Off. . |
| 0352105 | 1/1990 | European Pat. Off. . |
| 0429139 | 5/1991 | European Pat. Off. . |
| 0543446 | 5/1993 | European Pat. Off. . |
| 0549024 | 6/1993 | European Pat. Off. . |
| 1-49192 | 2/1989 | Japan . |
| 5189933 | 1/1992 | Japan . |

Primary Examiner—Nabil Z. Hindi
Attorney, Agent, or Firm—Michael E. Schmitt

[57] ABSTRACT

The disclosure relates to a device for recording information in a servo-track (2) of a record carrier (1) of a rewritable type. Pieces of information, for example, in the form of pieces of music (tracks) are recorded in the servo-track (2) in accordance with first recording instructions. According to these first recording instructions information patterns representing a piece of information are allowed to be rewritten with information patterns for a new piece of information. At a later instant the information in the servo-track is rearranged. During that operation information recorded in accordance with the first recording instructions is read out and rewritten in accordance with second recording instructions. These second recording instructions prescribe that the pieces of information intended to be read out be recorded in the servo-track as a continuous series of information patterns and that the information patterns representing a piece of information be uninterrupted.

33 Claims, 5 Drawing Sheets

| IS | BA | EA |
|---|---|---|
| 1 | 0' 00".0 | 22'. 39".15 |
| 2 | 22' 41".63 | 31' 36".53 |
| 3 | 31' 38".25 | 42' 16".71 |
| 4 | 51' 07".35 | 61' 59".45 |

| TNO | p | q | BA | EA |
|---|---|---|---|---|
| 1 | 1 | 1 | 0'.7".0 | 22'.39".15 |
| 2 | 1 | 1 | 45'.06".10 | 58'.12".43 |
| 3 | 2 | 1 | 22'.39".16 | 45'.06".09 |
| 3 | 2 | 2 | 58'.12".44 | 65'.01".10 |

FIG.8

INFORMATION RECORDING DEVICE WHICH REARRANGES INFORMATION TO CLOSE GAPS

BACKGROUND OF THE INVENTION

The invention relates to a device for recording information in a track of a record carder of a rewritable type, which device comprises recording means for recording pieces of information in the form of information patterns in the servo-track of the record carrier in accordance with first recording instructions, according to which first recording instructions information patterns representing a piece of information are allowed to be rewritten with information patterns for a new piece of information.

Such a device is known, for example, from EP-A 0 275 972. With prior-art device it is possible to record pieces of information in the form of, for example, pieces of music (tracks). With prior-an device it is possible to rewrite previously recorded tracks with new tracks. The new track to be recorded will generally not be as long as the track that is rewritten. In the case where the newly recorded track is shorter than the track that is rewritten, the end of the newly recorded track will not link up with the beginning of the next track. Between the end of the newly recorded track and the beginning of the next track there will still be a pan of the originally recorded track.

The servo-track portions which contain these remainders are indicated in a table of contents present on the record carrier. When the record carrier is played back, the servo-track portions containing remainders are localized and skipped on the basis of the table of contents, so that these remainders do not become audible when played back.

SUMMARY OF THE INVENTION

It is an object of the invention to provide a device in which the reproduction of the remainders present can be avoided with simpler means in the playback phase.

This object is achieved by a device as defined in the opening paragraph, characterized in that the device comprises reading means for reading the information recorded in accordance with the first recording instructions and rewriting means for rewriting the read-out information in accordance with second recording instructions, the second recording instructions prescribing that the recorded pieces of information intended to be read out be recorded in the track as a continuous series of information patterns and that the information patterns representing a piece of information be uninterrupted, and including control means for controlling the reading means and the recording means for the reading and rewriting of the information.

By rearranging the pieces of information on the record carrier after a previously recorded piece of information has been replaced by another piece of information, there is achieved that successive pieces of information link up with each other and no remainders of previously recorded pieces of information arc present any longer between successive pieces of information. When the record carrier is played back, the information in the servo-track can be read out in an uninterrupted reading operation in the order in which the information was recorded, without this leading to the reproduction of remainders of rewritten pieces of information in a time interval between the reproduction of successive pieces of information. This invention is therefore pre-eminently suitable for recording information on Compact Discs of a rewritable type which can be read out after recording by the already marketed Compact Disc audio players. However, it should be observed that the invention is not restricted to the application in combination with Compact Discs according to the CD audio standard, but is also applicable to recording devices for recording record carriers that can be read out by the already marketed reading devices for CD-ROM and CD-I.

Furthermore, there is observed that the application of the invention is not restricted to the application to Compact Disc recording. The invention may basically be applied to recording pieces of information on record carriers which can be read out by reading devices which generally read out the recorded information in an uninterrupted reading operation in the order in which the information has been recorded.

An embodiment for the device is characterized in that the device comprises a buffer memory coupled to the reading means for storing the read-out information, the buffer memory also being coupled to the recording means for supplying the information stored in the memory.

By incorporating the buffer memory it is possible to control the operations of reading and rewriting the information largely as two independent processes, which considerably simplifies the timing of the read and rewrite control.

A further embodiment of the device is characterized in that the control means are arranged for interrupting and resuming the reading and/or rewriting processes in dependence on the occupancy level of the buffer memory. This embodiment is advantageous in that the reading and rewriting processes can be interrupted and resumed in a simple and effective manner in the case where the buffer memory threatens to become empty or full.

Another embodiment of the device is characterized in that the device comprises command feeding means for feeding the commands indicating the order in which the information is to be recorded in accordance with the second recording instructions, and in that the control means are coupled to the command feeding means for receiving the fed commands, and in that the control means are arranged for effecting the re-writing in the order indicated by the fed commands.

This embodiment is advantageous in that the user is free to adapt the order in which the pieces of information have been recorded in the servo-track, and thus also the order in which the pieces of information are read out.

Another embodiment of the device is characterized in that the device comprises control means for controlling a velocity with which the servo-track is scanned during the recording, reading and rewriting operations with a first, second and third scanning velocity respectively, the second and third scanning velocities exceeding the first scanning velocity.

This embodiment is advantageous in that the time necessary for rearranging the information is reduced.

Another embodiment for the device is characterized in that the reading means comprise a read head for scanning the information to be read out and the rewriting means comprise a write head for scanning the servo-track for the purpose of rewriting, the scanning operation of the read head and the scanning operation of the write head being independently controllable.

Since the reading and rewriting operations are carded out simultaneously in this embodiment, the time necessary for rearranging the information is reduced compared with devices in which the reading and rewriting operations are carried out by the same read/write head. In addition, a smaller buffer memory will suffice. In the case where the bit rate of the read-out information and the information to be recorded is the same during simultaneous reading and rewriting operations, such as, for example, with record carriers of the CAV type (Constant Angular Velocity), a buffer memory may even be omitted completely.

BRIEF DESCRIPTION OF THE DRAWING

The invention will be further explained with reference to the drawing FIGS. 1 to 8, in which.

DESCRIPTION OF THE PREFERRED EMBODIMENT

Figure 1:
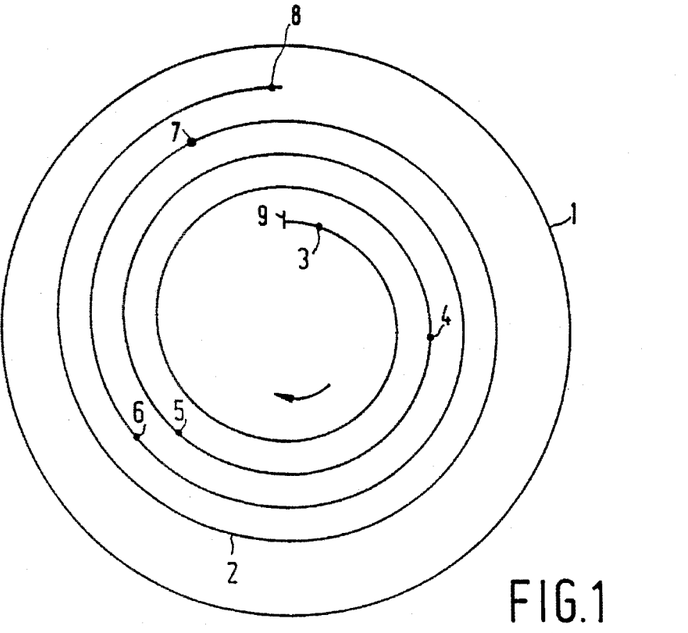
FIGS. 1 and 7 show record carriers to be used in the device according to the invention.

FIG. 1 shows in a diagram an embodiment for a record carrier 1 of a rewritable type, for example, an optical, magnetooptical or magnetic type. The record carrier 1 shown is disc-shaped, but in principle the invention may alternatively be applied to other types of record carriers, such as, tape-like record carriers. However, the invention will be further explained with reference to disc-shaped record carriers. The record carrier 1 comprises a spiral servo-track 2 in which information patterns are recorded or can be recorded by optical means. Thereto the record carrier comprises a recording layer which undergoes an optically detectable change if radiated with sufficient intensity. Various types of such layers are known. Especially attractive are the recording layers that present, after recording, an optical behaviour that corresponds to the optical behaviour of the generally known Compact Discs of the read-only type. For a description of these attractive recording layers reference be made to EP-A 0 352 105, EP-A-0 549 024, to which U.S. patent application Ser. No. 08/003,085 corresponds, and European Patent Applications 93200466.6, to which U.S. patent application Ser. No. 08/197,046 corresponds which are herewith deemed incorporated by reference.

Figure 2:
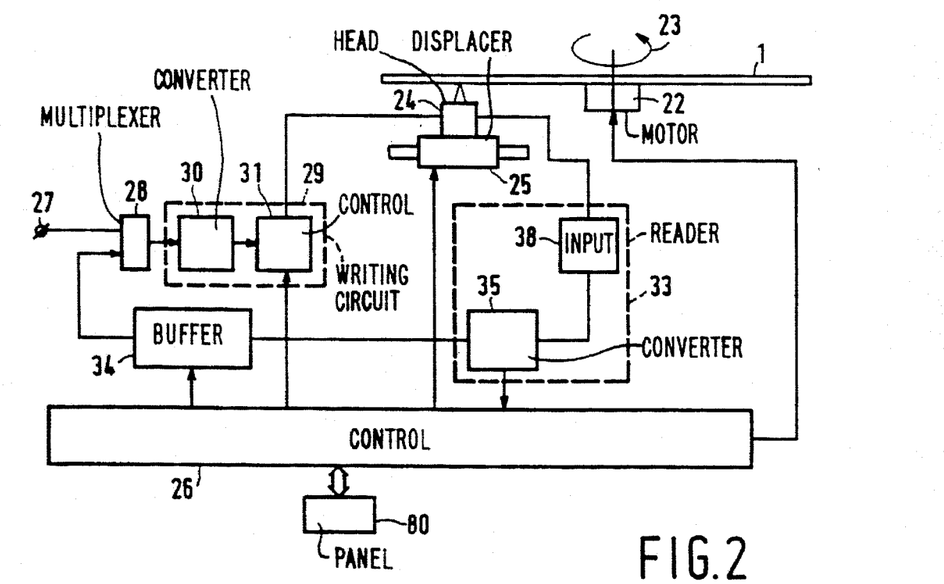
FIGS. 2 and 5 show embodiments for devices according to the invention.

An embodiment of the device according to the invention is shown in detail in FIG. 2. The recording device comprises a read/write head 24 of a customary type. For the servo-tracks of the record carrier 1 to be scanned, the record carrier 1 is driven relative to the read/write head 24 by means of a drive motor 22 which rotatingly drives the record carrier around an axis 23 so that the record carrier 1 can be scanned. The radial scanning point is adjusted in a customary fashion, so that the scanning point substantially follows the servo-track 2 of the record carrier 1. The scanning velocity is controlled in a customary fashion by a control unit 26 thereto coupled to the drive motor. For searching the desired servo-track portions, the device comprises a displacement mechanism 25 for displacing in radial direction the scanning point under the control of the control unit 26. The scanning device has an input 27 for receiving a digital information signal which represents pieces of information, for example, in the form of an audio or video program. The information signal received on the input 27 is supplied via a multiplex circuit 28 to a writing circuit 29 of a customary type so that the supplied information is convened into a suitable control signal for the read/write head 24. The writing circuit 29 comprises a signal converter 30 for convening the received information signal into a write signal in accordance with predetermined converting instructions. The signal converter may comprise a combination of a what is commonly referred to as CIRC encoder and EFM modulator as customarily used for recording CD signals. The write signal is applied to control circuit 31. The control circuit is of a customary type which converts the received write signal into a control signal for the read/write head 24, so that the information pattern recorded in servo-track 2 of the record carrier 1 corresponds to the write signal applied to the control circuit 31.

The control unit 26 is arranged for controlling the writing of information. The control unit 26 may be of a programmable type which has a suitable control program for controlling the writing according to writing instructions that allow information patterns that represent a piece of information being rewritten with information patterns for a new piece of information.

A suitable control program is described in detail in EP-A 0 275 972 which document is herewith deemed incorporated in the description by reference. When the program described there is executed, a continuous servo-track portion of sufficient length is selected for a new piece of information to be recorded. Such a portion may comprise a still virgin area or an area left free to be rewritten in which a piece of information is written that no longer needs to be saved.

In the case where the length of the new piece of information to be recorded is shorter than the piece of information to be rewritten, there will be a "gap" between the end of the newly inscribed piece of information and the beginning of the next piece of information if the latter recording instructions are applied. In this "gap" there is still the remaining portion of the original piece of information. In the case where the length of a new piece of information to be recorded exceeds that of a piece of information released to be rewritten the information to be recorded is recorded in an other part of record carrier which is long enough, resulting that there will be a "gap" with the length of the original piece of information.

FIG. 1 shows by way of example, an order of the pieces of information in the servo-track 2 which order may be obtained if information is recorded in accordance with recording instructions described in said document EP-A 0 275 972. The servo-track 2 of the record carrier 1 accommodates the information patterns for four pieces of information, that is to say, a first piece of information in the servo-track portion between points 3 and 4, a second piece of information between points 4 and 5, a third piece of information between the points 5 and 6, and a fourth piece of information between the points 7 and 8. Between the points 6 and 7 there is a "gap" in which still a rest of a partly rewritten piece of information is present.

Figure 3:
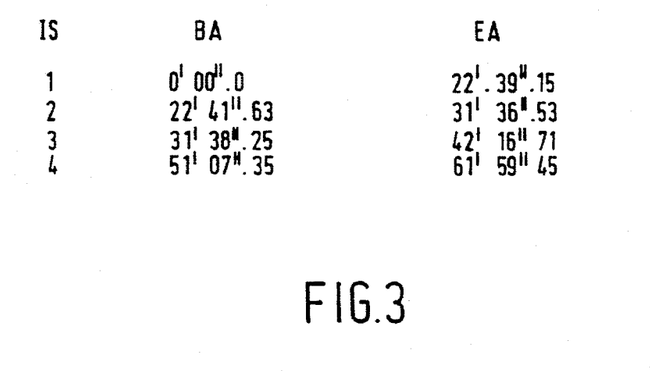
FIGS. 3 and 8 show tables of contents stating the addresses of pieces of information recorded in the servo-track.

On the record carrier 1 is also recorded the table of contents information denoting the initial and final addresses of the servo-track portions in which the pieces of information have been recorded. This table of contents information may be included in a what is commonly referred to as table of contents which is written in an appropriate portion of the servo-track. Such a portion may be situated, for example, at the beginning of the servo-track 2 between the points 9 and 3. For the case where the initial and final addresses are denoted by an absolute time code in a format as is customary in Compact Disc signals, FIG. 3 shows an example of a suitable table of contents. The table of contents comprises the initial addresses BA and the final addresses EA of the servo-track portions in which the information patterns for a piece of information have been recorded.

The record carriers obtained when the recording instructions described above are applied., are not highly suitable for playback by a player that reproduces the recorded information as a continuous information stream.

For, when pieces of information on the record carriers containing "gaps" with remainders of partly rewritten pieces of information are reproduced, the reproduction of the recorded information as a continuous information stream leads to undesired reproduction of the remainders present in the "gaps".

In order to outweigh this disadvantage, the device comprises rearranging means for rearranging the information. These rearranging means comprise a reading circuit 33 coupled to the read/write head 24 for reading the information present in servo-track 2. The reading circuit 33 comprises an input stage 38 and a converter 35 which converts detection signals detected in a customary fashion by the read/write head 24 into a reading signal. By the converter 35 the reading signal is re, converted into an information signal having a format corresponding to the information signal received through input 27. If the recorded information has been formatted and modulated in accordance with the CD standard, the converter 35 comprises a CIRC decoder and EFM demodulator of a customary type. Under the control of the control unit 26 information is read from the servo-track 2 and stored in a buffer memory 34 after which, still under the control of the control unit but via the multiplex circuit 28, the information is applied to the writing circuit to be rewritten in the servo-track 2 in accordance with the recording instructions which prescribe that the pieces of information recorded to be read out are recorded in the servo-track as a continuous series of information patterns and the information patterns representing a piece of information are uninterrupted. This reading and rewriting process will henceforth be referenced information rearrangement in the servo-track.

Figure 4:
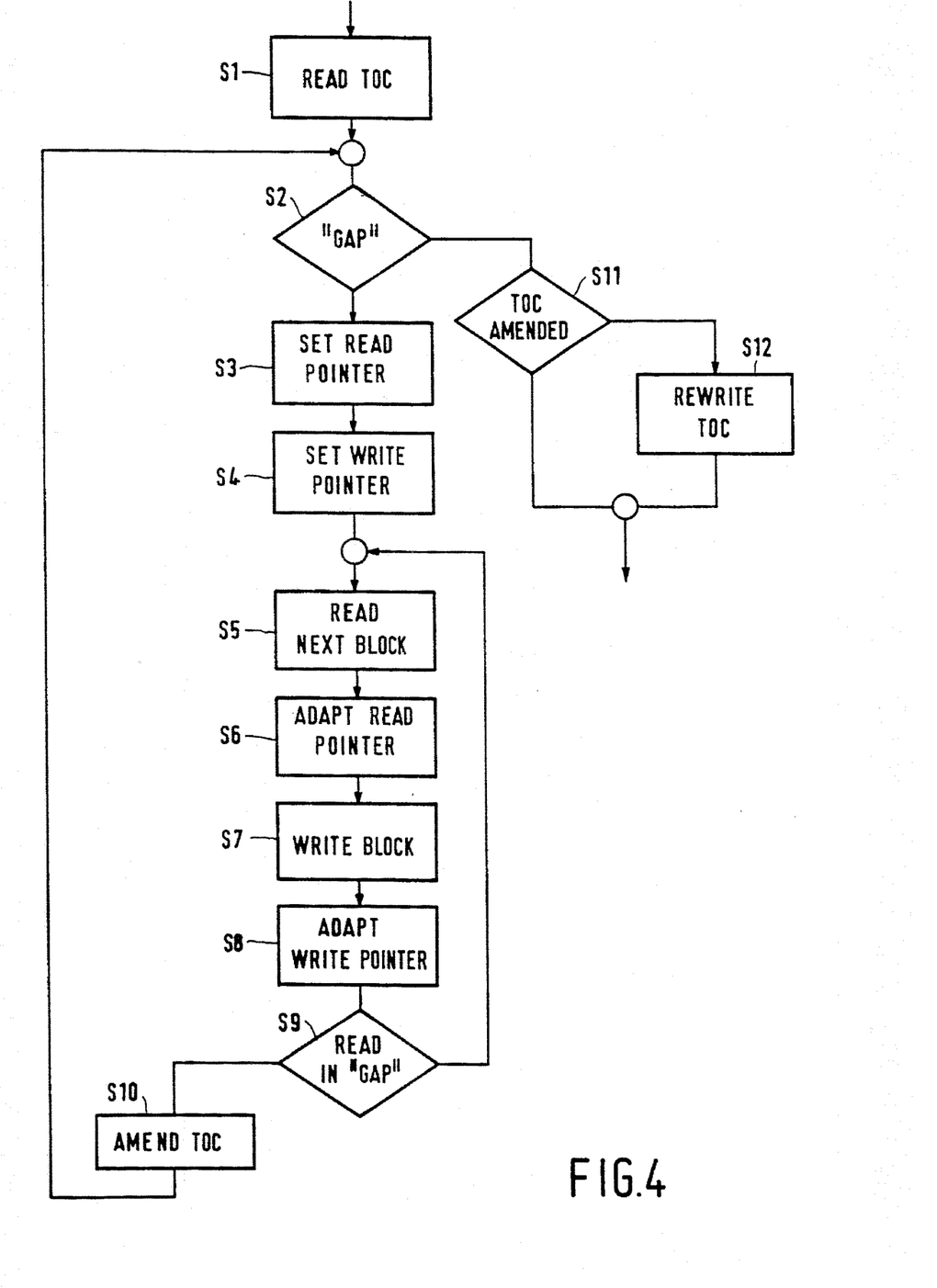
FIGS. 4 and 6 show flow charts of programs carried out by the control units of the devices shown in FIGS. 2 and 5.

A flow chart of a suitable control program by which this can be realised will be described hereinafter with reference to FIG. 4. This program starts with a step S1 in which the table of contents present in the servo-track portion between points 9 and 3 is read out. This table of contents will be referenced TOC for brevity. The TOC is copied to an internal memory of the control unit 26. Then, in step S2 there is detected on the basis of the TOC whether there is a "gap" between successive pieces of information. If there is, an address denoting the beginning of the piece of information following the first "gap" between pieces of information is assigned to a read pointer in step S3.

Then, in step S4, a write pointer is assigned an address value denoting the address of the beginning of the first occurring "gap". Subsequently, in step S5, an amount of information is read from the servo-track portion whose beginning is denoted by the read pointer. This read-out information is stored in the buffer memory 34. The amount of information read during a reading operation is selected to be smaller than the storage capacity of the buffer memory 34. Such an amount of information will further be referenced a block of information.

The end of the reading operation can be determined on the basis of the occupancy level of the buffer memory 34. The occupancy level in this respect is the ratio of the amount of information stored in the buffer memory and intended to be recorded on the record carrier to the storage capacity of the memory. For a detailed description of a control of an interruption of the reading operation on the basis of the occupancy level of the memory reference be made to EP-A-0 429 139, to which U.S. Pat. No. 5,212,678 corresponds which document is herewith deemed incorporated by reference.

Once the block of information has been read out, the read pointer is assigned a new address value denoting the address of the servo-track position where the reading of the block of information has stopped.

Step S6 is followed by step S7 in which a block of the information present in the buffer memory is written in a servo-track portion whose beginning is denoted by the write pointer. The instant at which the writing is interrupted may be determined, for example, in dependence on the occupancy level of the buffer memory as described in detail in EP-A-0 429 139. After step S7 has been executed, a value denoting the address of the position at which the writing is interrupted is assigned to the write pointer in step S8.

In Step S9 there is determined on the basis of the TOC whether the read pointer points to an address situated in a "gap". If it does not point to a "gap", step S9 is followed by step S5, so that a next block of information is read and rewritten.

However, if it appears when step S9 is being executed that a read pointer does point to an address in a "gap", this means that a complete piece of information has been rewritten. In that case step S9 is followed by step S10, in which the TOC in the internal memory of the control unit 26 is adapted in accordance with a new initial address and a new final address of the most recently rewritten piece of information. Once step S10 has been executed, the program is followed by the execution of step S2 in which there is verified whether there are still "gaps" between the pieces of information. If there are, steps S3 and S4 are resumed, in which new initial values are assigned to the read pointer and write pointer. Subsequently, while the program loop formed by the steps S5 to S9 is carried out, the next piece of information is rewritten.

However, if in step S2 it has appeared that "gaps" no longer occur between the pieces of information, the program is resumed with step S11. Herein there is established, for example, on the basis of differences between the TOC present on the record carrier and the TOC present in the internal memory, whether the TOC saved in the internal memory differs from the TOC present on the record carrier. If it does not, the program is terminated. If it does, the TOC present on the record carrier is rewritten in step S12 in accordance with the TOC present in the internal memory. Then, the program is terminated.

When the information supplied through the input 27 is recorded, generally a scanning velocity is used which is determined by the bit rate at which the digital information is supplied. When signals are recorded in accordance with the CD standard, this implies that the scanning velocity lies between 1.2 and 1.4 meters per second. When the information is rearranged, the scanning velocity may be different from the rate for recording the information supplied through input 27. Preferably, when the information is read out and rewritten, the scanning velocity is to be set higher during the rearrangement than the scanning velocity for the writing of information supplied through input 27, so that the time necessary for the rearrangement is shortened.

In the embodiment described hereinbefore the read/write head 24 is used both for reading purposes during the information rearrangement and for writing the information in servo-track 2.

Figure 5:
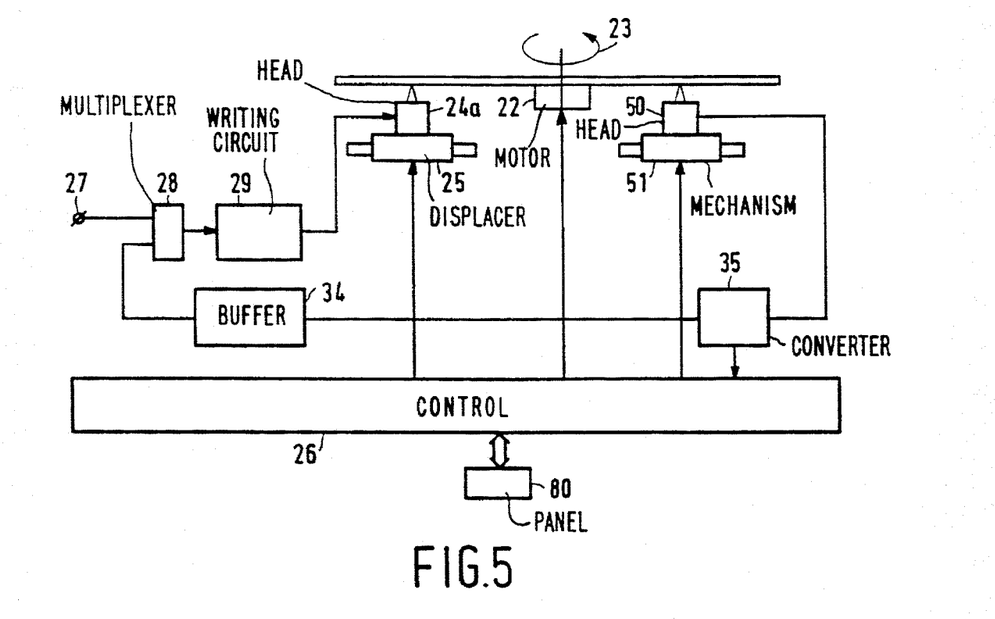

The velocity of the rearrangement process may be increased considerably if two separate heads are used for reading and rewriting. An embodiment in which this is realised is shown in FIG. 5. In this drawing Figure the parts corresponding to the parts of the embodiment shown in FIG. 2 are denoted by like references. For writing the information received through input 27 a write head 24a of a customary type is used. For reading the information from the servo-track 2 a read head 50 of a customary type is used. The read head 50 can be moved independently of the write head 24a by a mechanism 51. The recording of information received through input 27 is again controlled in a customary fashion by the control unit 26. When the information is rearranged, information is read out from the servo-track by the read head 50 controlled by the control unit. The read-out information is stored in the buffer memory. Simultaneously, under the control of the control unit 26, the information stored in the memory 34 is rewritten.

Figure 6A:
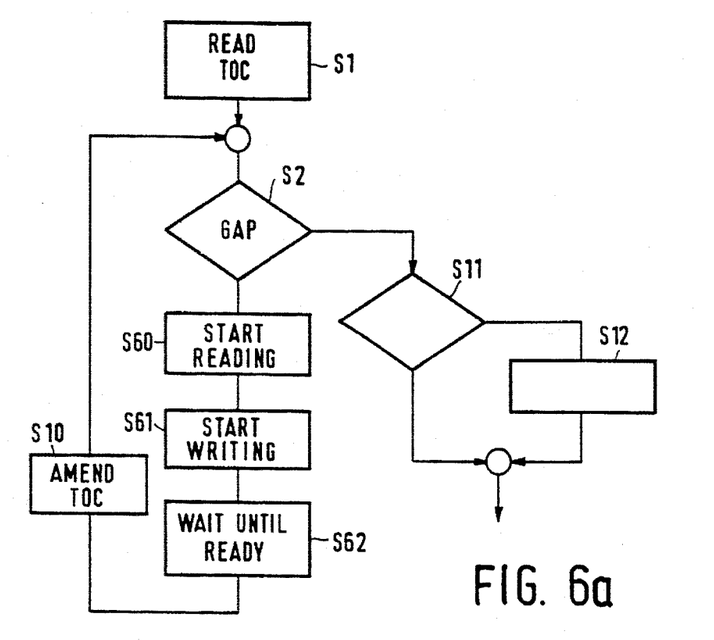
Figure 6B:
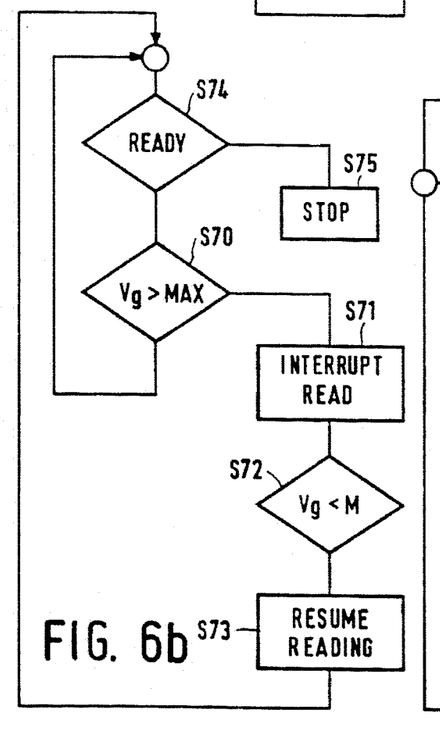
Figure 6C:
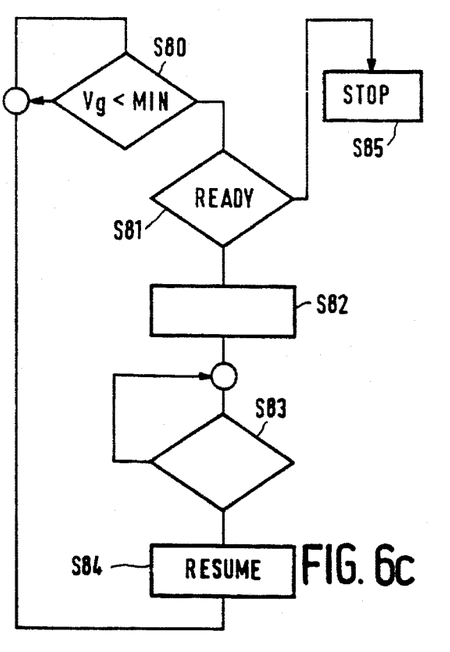

The control unit has a suitable control program for controlling the rewriting and reading operations during the rearrangement of the information in the servo-track. A flow chart of an embodiment for such a program is shown in FIG. 6. Program steps corresponding to the program shown in FIG. 4 are denoted by like references. When step S2 is carded out, there is established again on the basis of the TOC present in the internal memory whether there is a "gap" between successive pieces of information. In the case where the pieces of information are arranged in servo-track 2 in accordance with the TOC represented in FIG. 3, there is a "gap" between the third and fourth pieces of information. Due to the fact that the presence of this "gap" has been established, step S2 will be followed by step S60, in which a reading process for reading the piece of information directly succeeding the established "gap" is started. In this case this is the piece of information denoted fourth piece of information in the TOC of FIG. 3. Step S60 is followed by step S61. In step S61 a writing process is commenced for rewriting information loaded in the buffer memory 34 during the reading process. This information is initially written at the beginning of the "gap". Thus, in this case directly after the piece of information denoted third piece of information in the TOC of FIG. 3. Then, in step S62, the end of the started reading process and the started rewriting process is waited for. Afterwards, in step S10, the TOC in the internal memory is amended. Then, the program is resumed with step S2.

The program represented in FIG. 6 comprises a program module for controlling interruptions and resumptions of the reading process in dependence on the occupancy level of the buffer memory 34. This module comprises a step S70 in which there is established whether the occupancy level of the buffer memory 34 has reached a specific maximum value. If it has, the reading process is interrupted when step S71 is carried out. Then, in step S72, there is tested whether the occupancy has again dropped to a specific level. If so, the step S72 is followed by a step S73 in which the reading process is resumed. Step S73 is followed by step S74 in which there is tested whether all information of the relevant piece of information to be read out has actually been read out. If it has, the reading process is stopped in step S75. If it has not, step S74 is followed by step S70. The control of the interruption and resumption of the reading process may be performed, for example, similarly to what has been described in detail in said document EP-A-0 429 139.

The program in FIG. 6 further includes a program module for controlling the interruption and resumption of the writing process in dependence on the occupancy level of the buffer memory 34. This program module comprises a step S80 in which there is tested whether the occupancy level of the buffer memory lies above a minimum value. If it does not, there is tested in step S81 whether all information to be written of the relevant piece of information has actually been written. If this is not the case, step S81 is followed by step S82 in which the writing process is interrupted. Step S82 is followed by step S83 in which there is tested whether the occupancy level has increased to above a specific level. If this is the case, step S84 is carried out in which the writing process is resumed. Step S84 is followed by step S80 in which there is tested once again whether the occupancy has dropped below the minimum level. Once it has appeared during the execution of step S81 that all information of the relevant piece of information has been written, the writing process is stopped in step S85.

The interruption and resumption of the writing process may also be controlled, for example, as has been described in detail in said document EP-A-0 429 139.

The interruption and resumption of the reading and writing processes is especially advantageous in the case where the bit rate of the read-out information differs from that of the writing process as is the case with record carriers on which the amount of information written per unit of length of the servo-tracks is constant. Such record carriers are often referenced record carriers of the CLV type (Constant Linear Velocity). Since the radial positions of reading and rewriting are different, also the bit rate of the read-out signal will differ from the bit rate of the signal to be written when record carriers of the CLV type are used. This means that the occupancy level of the buffer memory changes when information is simultaneously written and read out. If the reading always takes place at a radial position farther from the point of rotation than the radial position during writing, which is a must in record carriers that are to be read from the inside out, such as for example, Compact Discs, the bit rate of the read signal will be higher than that of the write signal. This means that the occupancy level increases for simultaneous reading and writing. In this case the interruption of the writing process does not, in essence, need to be controlled. However, when a piece of information written in a number of non-consecutive servo-track portions is read out, some time may pass for the searching of the various servo-track portions. In that case a control of the interruption may be useful. It will be obvious to the expert that for record carriers that are to be read out from the outside in, the bit rate of the write signal will exceed that of the read signal. In that case the interruption of the reading process needs to be controlled.

In the embodiments described hereinbefore, always a buffer memory has been used. The use of such a buffer memory is advantageous in that the writing and reading during the rearrangement can be controlled mutually independently. However, there should be observed that the use of a buffer memory is not always necessary, for example, in the case where the record carrier is a record carrier of the CAV type (Constant Angular Velocity). With such record carriers the record carrier is independent of the radial position at a given constant angular velocity. In that case, the information at the output of the writing circuit can directly be fed to the reading circuit when there are separate read and write heads. In said embodiments of the device according to the invention each piece of information received from input 27 is written in accordance with recording instructions in which the information for the same piece of information is written uninterruptedly.

When recording takes place in accordance with the instructions described in EP-A-0 543 446, to which U.S. patent application Ser. No. 07/944,562 corresponds a record carrier may be obtained in which information patterns representing the same piece of information are not contiguous.

Figure 7:
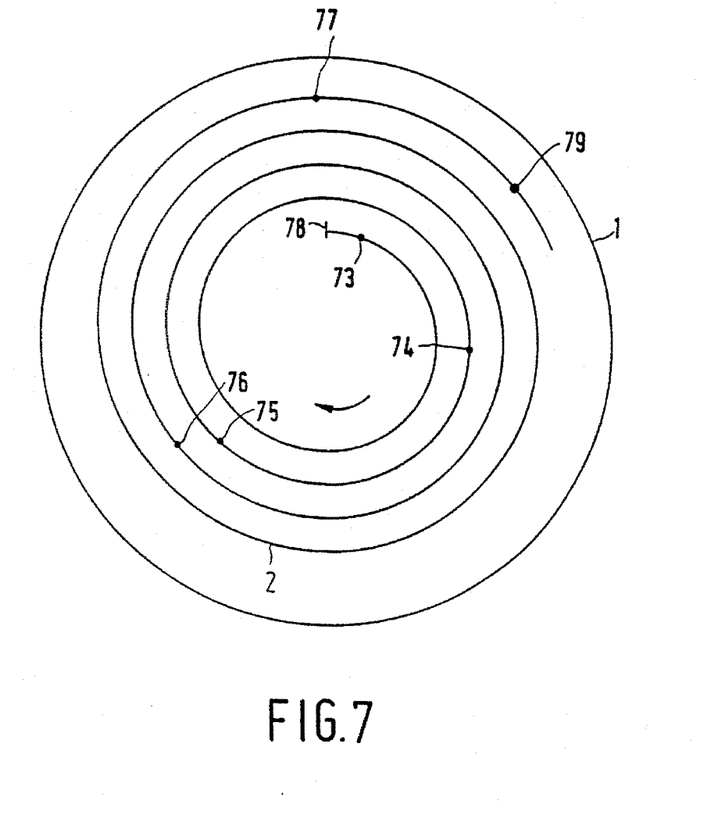
Figure 8:
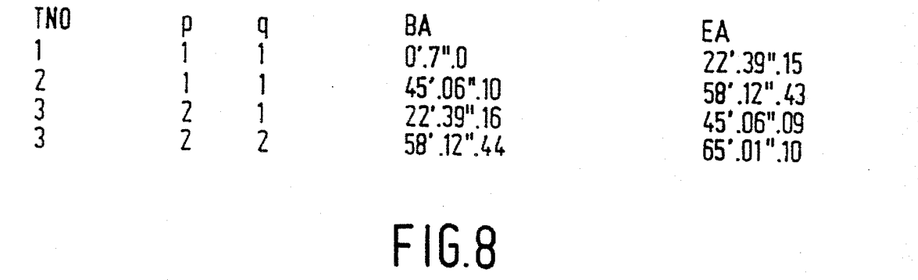

In FIG. 7 there are in the servo-track 2 of the record carrier 1 the information patterns for three pieces of information, that is to say, a first piece of information in the servo-track portion between the points 73 and 74, a second piece of information between points 75 and 76, and a third piece of information whose first part is written between the points 74 and 75 and whose second part lies between points 77 and 79.

Written on the record carrier 1 is also the TOC designating the initial and final addresses of the servo-track portions in which the pieces of information have been written. This TOC may be included, for example, in a specified servo-track portion. Such a portion may be located, for example, at the beginning of servo-track 2 between the points 78 and 73. For the case where the initial and final addresses are denoted by an absolute time code, as is customary with Compact Disc signals, FIG. 3 shows an embodiment of a suitable TOC. The TOC comprises the initial addresses BA and the final addresses EA of the servo-track portions that comprise information patterns for a piece of information. Column TNO indicates to which piece of information the information in the relevant servo-track portion belongs. In column p the number of servo-track portions used for writing the relevant piece of information is stated. Column q denotes the serial number of the servo-track portion within the series of consecutive servo-track portions in which the relevant piece of information has been written. The column BA contains the initial addresses expressed in absolute time codes of the written pieces of information, whereas column EA denotes the final addresses of the relevant servo-track portions.

The information about the addresses of the servo-track portions used for the recording of the pieces of information is preferably written on the record carrier itself. However, in the case where the recording device comprises a non-exchangeable record carrier, this information may also be written in a non-volatile memory of the recording device itself.

In the embodiment for the device described hereinbefore, the information of a piece of information is distributed over a number of non-consecutive servo-track portions. This is especially advantageous if the record carrier has no servo-track portion available that is sufficiently long to write the complete piece of information on. In that case the method as described in said Patent Application presents the possibility to distribute the information over two or more non-consecutive servo-track portions.

The manner of writing is additionally highly user-friendly. For the player determines which released servo-track portions are used for writing purposes. Thus the user no longer needs to select a released servo-track himself.

The information supplied can be written according to said recording instructions after the minor adaptation with the aid of the embodiments represented in FIGS. 2 and 5. This adaptation relates to the insertion of a buffer memory between the input 27 and the writing circuit 29 and an adaptation of the control program as has been described in detail in EP-A-0 543 446 referred to above, which is herewith deemed incorporated by reference.

The record carriers obtained when said recording instructions are implemented, are not highly suitable for playback by a player that reproduces the written information as a continuous information stream.

With record carriers in which the information pattern of a complete piece of information has not been written in one piece, a reproduction of such a continuous information stream will lead to the fact that the reproduction of a piece of information is constantly interrupted by the reproduction of another piece of information. This objection can be met by rearranging the information so that after the rearrangement, the information patterns for each of the pieces of information are uninterrupted and "gaps" with remainders of the rewritten pieces of information no longer occur between the consecutive pieces of information in servo-track 2. The control unit thereto comprises a suitable program for realising the rearrangement in accordance with algorithms known per se (defragmentation) for information rearrangement.

Furthermore, a device may advantageously comprise command feeding means, for example, in the form of a customary operating panel 80 with keys for entering commands that are indicative of the desired order in which the pieces of information are to be arranged in the servo-track after the rearrangement. The operating panel is coupled to the control unit 26 for passing the entered commands to the control unit 26. The program carried out by the control unit is adapted for rearranging the pieces of information in accordance with the order laid down by the entered commands.

The invention is pre-eminently suitable for use in combination with what is commonly referred to as rewritable Compact Discs. With the device according to the invention it is possible to remove from a rewritable Compact Disc a piece of information and possibly substitute same by another piece of information in a manner in which the Compact Disc can be read out by the already marketed Compact Disc players without annoying effects being experienced in the reproduction after the piece of information has been removed (and possibly substituted). There should be observed, however, that the invention is not restricted to the use in combination with Compact Discs. The invention is suitable for use in combination with all sorts of rewritable record carriers of which the written information is read out by already marketed playback devices in the order in which the information is present in the servo-track, such as, for example, video cassette reading devices or reading devices for digital audio tapes (DCC cassettes).

I claim:

1. A device for recording information in a track of a rewritable record carrier, comprising:

means for recording pieces of information in the form of information patterns in accordance with first recording instructions, wherein the first recording instructions allow information patterns representing an old piece of information to be written with information patterns for a new piece of information, means for reading the information recorded in accordance with the first recording instructions, re-writing means, responsive to second recording instructions, for re-writing the information read out by said means for reading, and means for controlling the means for recording, the means for reading, and the re-writing means, the means for controlling providing the second recording instructions so that the recorded pieces of information which are intended to be read out are recorded in said track as a continuous series of information patterns, and the information patterns representing each respective piece of information which is intended to be read out be uninterrupted.

2. A device as claimed in claim 1, characterized in that:

the device further comprises command feeding means for feeding commands indicating the order in which information is to be recorded in accordance with the second recording instructions, the control means is coupled to the command feeding means for receiving the fed commands, and the control means is arranged to effect re-writing in the order indicated by the fed commands.

3. A device as claimed in claim 1, characterized in that:

the means for reading comprises a read head for scanning the information to be read out, the re-writing means comprises a write head for scanning the track to re-write, and scanning operation of the read head and scanning operation of the write head are independently controllable.

4. A device as claimed in claim 1, characterized in that the device further comprises a buffer memory coupled to the means for reading for storing read-out information, and the buffer memory is also coupled to the re-writing means for supplying information stored in the buffer memory.

5. A device as claimed in claim 4, characterized in that:

the device further comprises command feeding means for feeding commands indicating the order in which information is to be recorded in accordance with the second recording instructions, the control means is coupled to the command feeding means for receiving the fed commands, and the control means is arranged to effect re-writing in the order indicated by the fed commands.

6. A device as claimed in claim 4, characterized in that the control means is arranged for interrupting and resuming the reading and/or re-writing processes depending on the occupancy level of the buffer memory.

7. A device as claimed in claim 6, characterized in that:

the device further comprises command feeding means for feeding commands indicating the order in which information is to be recorded in accordance with the second recording instructions, the control means is coupled to the command feeding means for receiving the fed commands, and the control means is arranged to effect re-writing in the order indicated by the fed commands.

8. A device as claimed in claim 1 wherein said means for controlling controls a velocity with which the track is scanned during the recording, reading and re-writing operations with a first, second and third scanning velocity respectively, the second and third scanning velocities exceeding the first scanning velocity.

9. A device as claimed in claim 8, characterized in that:

the device further comprises command feeding means for feeding commands indicating the order in which information is to be recorded in accordance with the second recording instructions, the control means is coupled to the command feeding means for receiving the fed commands, and the control means is arranged to effect re-writing in the order indicated by the fed commands.

10. A device as claimed in claim 8, characterized in that:

the means for reading comprises a read head for scanning the information to be read out, the re-writing means comprises a write head for scanning the track to re-write, and scanning operation of the read head and scanning operation of the write head are independently controllable.

11. A device as claimed in claim 8, characterized in that the device further comprises a buffer memory coupled to the means for reading for storing read-out information, and the buffer memory is also coupled to the re-writing means for supplying information stored in the buffer memory.

12. A device as claimed in claim 11, characterized in that:

the device further comprises command feeding means for feeding commands indicating the order in which information is to be recorded in accordance with the second recording instructions, the control means is coupled to the command feeding means for receiving the fed commands, and the control means is arranged to effect re-writing in the order indicated by the fed commands.

13. A device as claimed in claim 11, characterized in that the control means is arranged for interrupting and resuming the reading and/or re-writing processes depending on the occupancy level of the buffer memory.

14. A device as claimed in claim 13, characterized in that:

the device further comprises command feeding means for feeding commands indicating the order in which information is to be recorded in accordance with the second recording instructions, the control means is coupled to the command feeding means for receiving the fed commands, and the control means is arranged to effect re-writing in the order indicated by the fed commands.

15. A device for re-writing old information in a track of a rewritable record carrier, the old information being rewritten together with new information in accordance with first recording instructions, the old and new information being in the form of information patterns, the device comprising:

reading means for reading old information recorded in accordance with the first recording instructions;

re-writing means, responsive to second recording instructions, for re-writing the old information read out by said means for reading; and control means for controlling the means for reading and the re-writing means, the control means providing the second recording instructions so that, following re-writing of the read out old information, the old and new information in said track that is intended to be readable forms a continuous series of uninterrupted information patterns.

16. The device of claim 15, further comprising command feeding means for feeding commands indicating the order in which information is to be recorded in accordance with the second recording instructions, the control means being coupled to the command feeding means for receiving and effecting the fed commands.

17. The device of claim 15, wherein the reading means comprises a read head for scanning the information to be read out, the re-writing means comprises a write head for scanning the track to re-write, and the respective scanning operations of the read head and write head are independently controllable.

18. The device of claim 15, wherein the reading means comprises a read head for scanning the information to be read out, the re-writing means comprises a write head for scanning the track to re-write, the read head and write head being implemented as a read/write head wherein the respective scanning operations of the read head and write head are dependently controllable.

19. The device of claim 15, further comprising a buffer memory, the buffer memory being coupled to the reading means so as to receive read-out information, and being coupled to the re-writing means for supplying the received read-out information thereto.

20. The device of claim 19, wherein the control means is arranged for interrupting and resuming the reading and/or re-writing processes depending on the occupancy level of the buffer memory.

21. The device of claim 15, wherein the control means controls a velocity with which the track is scanned during the recording, reading and re-writing operations with a first, second and third scanning velocity respectively, the second and third scanning velocities exceeding the first scanning velocity.

22. A method for re-writing old information in a track of a rewritable record carrier together with new information in accordance with first recording instructions, the old and new information being in the form of information patterns, the method comprising the steps of:

recording the new information in the track;

reading old information recorded in the track;

generating second recording instructions; and re-writing the read out old information, the re-writing being in accordance with the second recording instructions, the instructions providing for re-writing the read old information in said track so that old and new information form a continuous series of uninterrupted information patterns.

23. The method of claim 22, further comprising the step of detecting whether a gap exists between the information in the track and, responsive to detection of a gap, initiating the reading, generating and re-writing steps.

24. The method of claim 23, wherein said detection step comprises analyzing the addresses of successive pieces of information set forth in a table of contents.

25. The method of claim 24, further comprising the step of rewriting the table of contents following completion of the re-writing step.

26. The method of claim 23, wherein the reading step comprises assigning an initial address to a read pointer, the address indicating the beginning of information following a detected gap.

27. The method of claim 26, wherein the reading further comprises updating the address of the read pointer following reading of old information.

28. The method of claim 26, wherein the writing step comprises assigning an initial address to a write pointer, the address indicating the beginning of a detected gap, and updating the address of the write pointer following re-writing of old information.

29. The method of claim 23, wherein the writing step comprises assigning an initial address to a write pointer, the address indicating the beginning of a detected gap, and updating the address of the write pointer following re-writing of old information.

30. The method of claim 23, further comprising the step of further detecting whether a gap exists between the information in the track and, responsive to detection of a gap, resuming the reading, generating and re-writing steps.

31. The method of claim 22, further comprising the step of employing a buffer memory, the buffer memory to receive read-out information, and supplying the received read-out information for re-writing.

32. The method of claim 31, further comprising interrupting and resuming the reading and/or re-writing steps depending on the occupancy level of the buffer memory.

33. The method of claim 22, further comprising the step of controlling a velocity with which the track is scanned during the recording, reading and re-writing steps with a first, second and third scanning velocity respectively, the second and third scanning velocities exceeding the first scanning velocity.

* * * * *